United States Patent
Herklots et al.

(10) Patent No.: US 10,208,194 B2
(45) Date of Patent: Feb. 19, 2019

(54) COMPOSITION COMPRISING HETEROPHASIC PROPYLENE COPOLYMER

(71) Applicant: SABIC Global Technologies B.V., Bergen op Zoom (NL)

(72) Inventors: Marc Herklots, Roermond (NL); Désirée Marie Louise Seegers, Geleen (NL); Dzina Kleshchanok, Perstorp (SE)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/740,112

(22) PCT Filed: Jun. 23, 2016

(86) PCT No.: PCT/EP2016/064542
§ 371 (c)(1),
(2) Date: Dec. 27, 2017

(87) PCT Pub. No.: WO2017/001280
PCT Pub. Date: Jan. 5, 2017

(65) Prior Publication Data
US 2018/0186983 A1    Jul. 5, 2018

(30) Foreign Application Priority Data
Jul. 2, 2015 (EP) .................................. 15175117

(51) Int. Cl.
C08L 23/12 (2006.01)
C08F 210/06 (2006.01)
C08F 210/16 (2006.01)
C08F 299/02 (2006.01)
C08L 23/08 (2006.01)

(52) U.S. Cl.
CPC ............ *C08L 23/12* (2013.01); *C08F 210/06* (2013.01); *C08F 210/16* (2013.01); *C08F 299/02* (2013.01); *C08L 23/0838* (2013.01); *C08L 2205/02* (2013.01); *C08L 2207/02* (2013.01)

(58) Field of Classification Search
CPC ...... C08L 23/12; C08L 23/16; C08L 2205/02; C08L 2207/02; C08F 210/06; C08F 210/16
See application file for complete search history.

(56) References Cited

U.S. PATENT DOCUMENTS

| 4,282,076 A | 8/1981 | Boynton |
| 4,399,054 A | 8/1983 | Ferraris et al. |
| 4,472,524 A | 9/1984 | Albizzati |
| 5,432,209 A * | 7/1995 | Sobajima ................. C08K 9/04 523/200 |
| 6,713,594 B2 | 3/2004 | Horn et al. |
| 2007/0021560 A1 | 1/2007 | Tse et al. |
| 2009/0048399 A1 | 2/2009 | Reijntjens et al. |
| 2013/0123413 A1 * | 5/2013 | Lederer ................... C08L 23/10 524/451 |

FOREIGN PATENT DOCUMENTS

| EP | 0063654 A1 | 11/1982 |
| EP | 0566141 A2 | 10/1993 |
| EP | 1344793 A1 | 9/2003 |
| EP | 1391482 A1 | 2/2004 |
| EP | 2386602 A1 | 11/2011 |
| WO | 9829482 A1 | 7/1998 |
| WO | 2006010414 A1 | 2/2006 |
| WO | 2010015539 A1 | 2/2010 |
| WO | 2013144060 A1 | 10/2013 |
| WO | 2017085057 A1 | 5/2017 |

OTHER PUBLICATIONS

International Search Report for International Application No. PCT/EP2016/064542; International Filing Date: Jun. 26, 2016; dated Sep. 16, 2016; 4 Pages.
Written Opinion of the International Searching Authority for International Application No. PCT/EP2016/064542; International Filing Date: Jun. 26, 2016; dated Sep. 16, 2016; 6 Pages.

* cited by examiner

*Primary Examiner* — Mark S Kaucher
(74) *Attorney, Agent, or Firm* — Cantor Colburn LLP

(57) ABSTRACT

The invention relates to a composition comprising (A) a heterophasic propylene copolymer and (B) a block copolymer, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 60 to 95 wt % based on the total heterophasic propylene copolymer and (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and wherein the block copolymer comprises a terminal block comprising styrene or alpha-methylstyrene and wherein the ratio of the melt flow rate of (A) the heterophasic propylene copolymer (MFIheterophasic) and the melt flow rate of (B) the block copolymer (MFIblock) is at most 50, preferably at most 40, at most 30, at most 25 or at most 20, wherein MFIheterophasic and MFIblock are measured in accordance with ISO 1133 using a 2.16 kg weight and at a temperature of 230° C.

16 Claims, No Drawings

COMPOSITION COMPRISING HETEROPHASIC PROPYLENE COPOLYMER

CROSS REFERENCE TO RELATED APPLICATIONS

This application is a 371 of International Application No. PCT/EP2016/064542, filed Jun. 23, 2016, which claims priority to European Application No. 15175117.9, filed Jul. 2, 2015 which are incorporated herein by reference in their entirety.

The invention relates to a composition comprising a heterophasic propylene copolymer, to a process for obtaining such composition and to the use of such composition.

Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

Many applications of the heterophasic propylene copolymer require a good combination of optical properties and mechanical properties. One phenomenon which is undesired for many applications is stress whitening, which is the appearance of a white area on an object when a material is stressed by bending or punching operations. The appearance of a white area indicates that there is an onset of failure of the corresponding material. Stress whitening is an aesthetic problem because the white areas can be easily identified by the naked eye.

Attempts to improve optical properties and mechanical properties have been described e.g. in EP1344793 and US200948399. EP1344793 discloses adding a beta-nucleating agent to a heterophasic propylene copolymer for achieving a composition with high impact strength and high gloss. US200948399 discloses a propylene copolymer composition comprising a propylene homopolymer matrix and a propylene copolymer dispersed phase made using a Ziegler-Natta catalyst, which has a transparency higher than 8.

EP1391482 is directed to providing polypropylene compositions with good stiffness/impact balance and high gloss. EP1391482 mentions that for improving the stiffness and/or impact strength, it is known to add classical impact modifiers such as EPR, EOC, SEBS or reactor made heterophasic copolymers, but it is also known to negatively affect surface appearance. EP1391482 solves the problem by providing a composition comprising a heterophasic propylene copolymer and a reactively modified heterophasic copolymer with stabilised phase morphology.

It is an object of the invention to provide a heterophasic polypropylene composition having reduced stress whitening. The level of stress whitening can be expressed by the white spot size and the whiteness of the white spot, which can be determined by the method as described in the examples.

This object is achieved by a composition comprising (A) a heterophasic propylene copolymer and (B) a block copolymer,
wherein the heterophasic propylene copolymer consists of
  (a) a propylene-based matrix,
  wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 60 to 95 wt % based on the total heterophasic propylene copolymer and
  (b) a dispersed ethylene-α-olefin copolymer,
  wherein the dispersed ethylene-α-olefin copolymer is present in an amount of 40 to 5 wt % based on the total heterophasic propylene copolymer and
  wherein the sum of the total amount of propylene-based matrix and total amount of the dispersed ethylene-α-olefin copolymer in the heterophasic propylene copolymer is 100 wt %, and
  wherein the block copolymer comprises a terminal block comprising styrene or alpha-methylstyrene and
  wherein the ratio of the melt flow rate of (A) the heterophasic propylene copolymer (MFIheterophasic) and the melt flow rate of (B) the block copolymer (MFIblock) is at most 50, preferably at most 40, at most 30, at most 25 or at most 20, wherein MFIheterophasic and MFIblock are measured in accordance with ISO 1133 using a 2.16 kg weight and at a temperature of 230° C.

According to the present invention, it has surprisingly been found that the composition according to the invention shows a good resistance to stress whitening behaviour. This is especially important for application of said composition in the appliance and containers market.

It has been found according to the invention that the ratio of the melt flow rate of (A) the heterophasic propylene copolymer (MFIheterophasic) and the melt flow rate of (B) the block copolymer (MFIblock) has a large influence on both the optical properties and the mechanical properties. This ratio should not be too high for obtaining good stress whitening and is at most 50, for example at most 40, at most 30, at most 25 or at most 20. Preferably, this ratio is at least 0.1, for example at least 0.2 or at least 0.3. Preferably, this ratio is 0.3-20. In addition, the composition may have an improvement in one or more of the following optical properties: gloss and/or transparency; and/or in one or more of the following mechanical properties, such as izod impact strength (toughness) and/or tensile modulus.

It has further been found according to the invention that if the amount of the styrene or the alpha-methylstyrene in the block copolymer of the composition is smaller than 25 wt %, preferably less than 20 wt %, more preferably less than 15 wt % (based on the block copolymer) good stress whitening behaviour is achieved. In addition, the composition may have an improvement in one or more of the following optical properties: gloss and/or transparency; and/or in one or more of the following mechanical properties, such as izod impact strength (toughness) and/or tensile modulus.

Preferably, MFIblock is at least 0.5 dg/min, at least 1 dg/min. This has the advantage of further improving stress whitening and also that it increases toughness.

MFIheterophasic and MFIblock are measured in accordance with ISO 1133 using a 2.16 kg weight and at a temperature of 230° C.

(A) Heterophasic Propylene Copolymer

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by NMR, as well known in the art.

The propylene-based matrix consists of a propylene homopolymer and/or a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4-10 carbon atoms, for example ethylene, 1-butene, 1-pentene, 4-methyl-1-pentene, 1-hexen, 1-heptene or 1-octene, and is preferably ethylene.

Preferably, the propylene-based matrix consists of a propylene homopolymer.

The melt flow index (MFI) of the propylene-based matrix (before it is mixed into the composition of the invention), $MFI_{PP}$ may be for example at least 0.1 dg/min, at least 0.2 dg/min, at least 0.3 dg/min, at least 0.5 dg/min, at least 1 dg/min, at least 1.5 dg/min, and/or for example at most 50 dg/min, at most 40 dg/min, at most 30 dg/min, at most 25 dg/min, at most 20 dg/min, measured according to ISO1133 (2.16 kg/230° C.).

The propylene-based matrix is present in an amount of 60 to 95 wt %, for example 65 to 85 wt %, for example 70 to 85 wt %, for example 70 to 80 wt %, for example 65 to 75 wt % or 75 to 85 wt % based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM).

The MFI of the dispersed ethylene α-olefin copolymer (before it is mixed with other components of the composition of the invention) ($MFI_{EPR}$) may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min at most 10 dg/min, at most 5 dg/min, The MFI of the dispersed ethylene α-olefin copolymer ($MFI_{EPR}$) is calculated taking into account the MFI of the propylene-based matrix ($MFI_{PP}$), the MFI of the heterophasic propylene copolymer (MFIheterophasic) and rubber content (RC) according to the following formula:

$$MFIEPR = 10^{\wedge}\left(\frac{\text{Log } MFIheterophasic - \text{matrix content} * \text{Log } MFIPP}{\text{rubber content}}\right)$$

The dispersed ethylene-α-olefin copolymer is present in an amount of 40 to 5 wt %, for example in an amount of 35 to 15 wt % based on the total heterophasic propylene copolymer, for example in an amount of at least 20 wt % and/or for example in an amount of at most 30 wt % based on the total heterophasic propylene copolymer.

In the heterophasic polypropylene in the composition of the invention, the sum of the total weight of the propylene-based matrix and the total weight of the dispersed ethylene-α-olefin copolymer is 100 wt %.

The amount of ethylene in the ethylene-α-olefin copolymer is preferably in the range of 10-45 wt % based on the ethylene-α-olefin copolymer. More preferably, the amount of ethylene in the ethylene-α-olefin copolymer is 15-40 wt %, more preferably 15-30 wt %, more preferably 15-25 wt %. Such amount of ethylene in the ethylene-α-olefin copolymer leads to a good stress whitening behavior of the composition according to the invention.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

The MFI of the heterophasic propylene copolymer (MFIheterophasic) may be for example at least 0.1 dg/min, at least 0.2 dg/min, at least 0.3 dg/min, at least 0.5 dg/min, at least 1 dg/min or at least 1.5 dg/min, and/or for example at most 50 dg/min, at most 40 dg/min, at most 30 dg/min, at most 25 dg/min, at most 20 dg/min, at most 15 dg/min or at most 10 dg/min, measured according to ISO1133 (2.16 kg/230° C.).

In some embodiments, MFIheterophasic is for example less than 15 dg/min, less than 10 dg/min, less than 8 dg/min or less than 6 dg/min, and/or for example at least 0.1 dg/min, at least 0.2 dg/min, at least 0.3 dg/min, at least 0.5 dg/min, at least 1 dg/min or at least 1.5 dg/min or at least 2 dg/min, measured according to ISO1133 (2.16 kg/230° C.). In some preferred embodiments, MFIheterophasic is 2-6 dg/min. In these embodiments, a highly improved stress whitening property and impact strength are obtained while transparency and gloss and tensile modulus are maintained to acceptable levels. In these embodiments, especially when the ethylene content in the block copolymer is 10-40 wt % (for example at least 15 wt % or at least 18 wt % and/or at most 35 wt %, at most 30 wt % or at most 25 wt %), the transparency, stress whitening (spot size and whitening) and toughness are excellent.

In some embodiments, MFIheterophasic is for example at least 15 dg/min, at least 18 dg/min, at least 20 dg/min, and/or for example at most 200 dg/min, at most 100 dg/min, at most 50 dg/min, at most 40 dg/min, measured according to ISO1133 (2.16 kg/230° C.). In some preferred embodiments, MFIheterophasic is 30-40 dg/min. In these embodiments, an even further improved stress whitening property and impact strength are obtained while gloss and tensile modulus are maintained at acceptable levels. In these embodiments, especially when the ethylene content in the block copolymer is more than 40 wt %, the stress whitening (spot size and whitening) is excellent.

The values of the MFI of the propylene-based matrix ($MFI_{PP}$) and the MFI of the dispersed ethylene-α-olefin elastomer ($MFI_{EPR}$) mentioned herein are understood as the values before the heterophasic propylene copolymer is mixed with component (B) and optional component (C) to obtain the composition according to the invention. The value of the MFI of the heterophasic propylene copolymer (MFI heterophasic) refers to the final MFI of the heterophasic propylene copolymer. To exemplify this: In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

(B) Block Copolymer

The block copolymer used in the present invention is a block copolymer comprising a terminal block comprising styrene or alpha-methylstyrene. The block copolymer is preferably selected from the group consisting of polystyrene-polybutadiene, polystyrene-poly(ethylene-propylene) (SEP), polystyrene-polyisoprene, poly(alpha-methylstyrene)-polybutadiene, polystyrene-polybutadiene-polystyrene (SBS), polystyrene-poly(ethylene-butylene)-polystyrene (SEBS), polystyrene-poly(ethylene-propylene)-polystyrene, polystyrene-polyisoprene-polystyrene (SIS), poly(alpha-methylstyrene)-polybutadiene-poly(alpha-methylstyrene) and polystyrene-poly(ethylene-propylene-styrene)-polystyrene.

One preferred example of the block copolymer is polystyrene-polyisoprene-polystyrene (SIS). However, preferably, the block copolymer comprises a non-terminal block comprising ethylene, for example selected from the group consisting of polystyrene-poly(ethylene-propylene) (SEP), polystyrene-poly(ethylene-butylene)-polystyrene (SEBS), polystyrene-poly(ethylene-propylene)-polystyrene and polystyrene-poly(ethylene-propylene-styrene)-polystyrene. Most preferably, the block copolymer is polystyrene-poly(ethylene-butylene)-polystyrene (SEBS).

The amount of styrene or alpha-methylstyrene in the block copolymer is less than 25 wt %, for example less than 20 wt % or less than 15 wt % based on the block copolymer. Preferably, the amount of styrene or alpha-methylstyrene in the block copolymer is at least 5 wt %, for example at least 10 wt % or at least 15 wt % based on the block copolymer. These embodiments are advantageous in that they lead to a highly improved stress whitening property and impact strength while maintaining gloss and tensile modulus to acceptable levels. Transparency may also be maintained to an acceptable level. The amount of styrene or alpha-methylstyrene in the block copolymer is determined by $^{13}$C NMR measurements, for example according to the following method: The samples are dissolved in $C_2D_2Cl_4$ at 130° C. 2,6-Di-tert-butyl-p-cresol (DBPC) is added as an internal stabilizer. The $^{13}$C NMR measurements are performed on a Bruker500 Avance III NMR spectrometer equipped with a 10 mm-diameter cryo-cooled probehead operating at 125° C. The weight percentage of ethylene, butylene and styrene are obtained by analyzing the $^{13}$C NMR spectra.

When the block copolymer comprises a non-terminal block comprising ethylene, the amount of ethylene in the block copolymer is preferably 10-60 wt %. These embodiments are advantageous in that they lead to a very good stress whitening property and/or transparency. Particularly when MFIheterophasic is less than 15 dg/min, these embodiments lead to a very good stress whitening property. Particularly when MFIheterophasic is at least 15 dg/min, these embodiments lead to a very good transparency. When MFIheterophasic is less than 15 dg/min, the amount of ethylene in the block copolymer is preferably 10-40 wt %, for example 15-35 wt % for achieving particularly good stress whitening property. When MFIheterophasic at least 15 dg/min, the amount of ethylene in the block copolymer is preferably 40-60 wt %, for example 45-55 wt % for achieving particularly good stress whitening property. The amount of ethylene in the block copolymer is determined by $^{13}$C NMR measurements, for example according to the following method: The samples are dissolved in $C_2D_2Cl_4$ at 130° C. 2,6-Di-tert-butyl-p-cresol (DBPC) is added as an internal stabilizer. The $^{13}$C NMR measurements are performed on a Bruker500 Avance III NMR spectrometer equipped with a 10 mm-diameter cryo-cooled probehead operating at 125° C. The weight percentage of ethylene, butylene and styrene are obtained by analyzing the $^{13}$C NMR spectra.

The amount of the block copolymer in the composition according to the invention is preferably between 0.5-15 wt %, preferably 0.5 to 1o wt %, for example 1-10 wt %, more preferably 1-5 wt %, based on the total weight of the composition. For example, the amount of block copolymer in the composition of the invention is at least 0.5, for example at least 1, for example at least 2, for example at least 3, for example at least 5 and/or for example at most 15, for example at most 12, for example at most 10 wt %. A higher amount of the block copolymer generally results in a higher haze. In some embodiments, the amount of the block copolymer in the composition according to the invention is 3-15 wt %. In some embodiments, the amount of the block copolymer in the composition according to the invention is 3-15 wt % and the MFIheterophasic is less than 15 dg/min, wherein the MFIheterophasic is measured in accordance with ISO 1133 using a 2.16 kg weight and at a temperature of 230° C. In some embodiments, the amount of the block copolymer in the composition according to the invention is 3-15 wt % and the MFIheterophasic is at least 15 dg/min, wherein the MFIheterophasic is measured in accordance with ISO 1133 using a 2.16 kg weight and at a temperature of 230° C. In these embodiments, good stress whitening behavior, a high haze and a high impact strength are obtained.

(C) Optional Components

The composition according to the invention may optionally comprise at least one optional component (C). Examples of optional components (C) are peroxides and other additives. The amount of the optional component (C) is typically 0 to 30 wt % of the total of the composition.

Peroxides

In some embodiments, the composition according to the invention can be obtained by melt-mixing a peroxide with components (A) and (B). The composition obtained by the addition of a peroxide has a different (higher) MFI from the MFI of the heterophasic copolymer used in preparing the composition. This step is also known in the art as visbreaking or shifting. The term "visbreaking" is well known in the field of the invention. For example methods of visbreaking polypropylene have been disclosed in U.S. Pat. No. 4,282,076 and EP 0063654. It is also possible to first melt-mix a peroxide with component (A), which changes the melt flow index of the heterophasic propylene copolymer, and then mix with component (B).

Examples of organic peroxides are well known and include dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate and 3,6,9-Triethyl-3,6,9,-trimethyl-1,4,7-triperoxonane.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition of the heterophasic propylene copolymer.

When a peroxide is used, the amount of peroxide will typically lie in the range of 0.02 to 0.5 wt % based on the heterophasic propylene copolymer.

In some embodiments, the composition according to the invention is prepared without using a peroxide.

Additives

The composition according to the invention may further comprise additives. The additives may include nucleating agents, stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; blowing agents; inorganic fillers and reinforcing agents.

The skilled person can readily select any suitable combination of additives and additive amounts without undue experimentation. The amount of the additives depends on their type and function and typically is of from 0 to about 30 wt %. The amount of the additives may e.g. be from about 1 to about 20 wt %; from about 2 to about 10 wt % or of from 3 to about 5 wt % based on the total composition.

The sum of all components added in the process of the invention to form the composition comprising (A) the heterophasic propylene copolymer, (B) the block copolymer and (C) the optional components should add up to 100% by weight.

Preferably, the total of components (A) and (B) is at least 70 wt %, at least 80 wt %, at least 90 wt %, at least 95 wt %, at least 97 wt %, at least 98 wt %, at least 99 wt %, at least 99.5 wt %, at least 99.9 wt % or 100 wt % of the total composition.

The invention further relates to a composition comprising no or little amount of a inorganic filler, for example talc. The amount of the inorganic filler in the composition according to the invention may for example be at most 0.5 wt %, at most 0.1 wt % or 0 wt %.

The invention further relates to a composition comprising no or little amount of a polypropylene homopolymer as an additional component to components (A) and (B).

The amount of the additional polypropylene homopolymer in the composition according to the invention may be at most 5 wt %, at most 3 wt %, at most 1 wt %, at most 0.5 wt %, at most 0.1 wt % or 0 wt %.

Process

The composition of the invention may be obtained by a process comprising melt-mixing (A) the heterophasic copolymer, (B) the block copolymer and (C) the optional component by using any suitable means. Accordingly, the invention further relates to a process for the preparation of the composition according to the invention comprising melt mixing (A) and (B) and optionally (C).

The melt-mixing of the components may be done in any order. For example, (A) the heterophasic copolymer and (C) the optional component may be melt-mixed before melt-mixing with (B) the block copolymer. A composition of (A) the heterophasic copolymer and (C) the optional component for example in the form of a pellet may first be obtained and then be melt-mixed with (B) the block copolymer. Alternatively, components (A) and (B) are melt-mixed, or components (A), (B) and (C) are melt-mixed.

Preferably, the composition of the invention is made in a form that allows easy processing into a shaped article in a subsequent step, like in pellet or granular form.

The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components (B) and/or (C) are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 200-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed are in the range from about 100 rpm to about 400 rpm.

Properties of (A) or (A) and (C)

Preferably, the heterophasic propylene copolymer and/or a composition consisting of the heterophasic propylene copolymer and additives has a relatively high transparency. Transparancy as used in here is defined as transmission minus Haze. The determination of the haze and transmission values is carried out in accordance with the standard ASTM D1003 using as test specimens injection moulded plates having an edge length of 65*65 mm and a thickness of 1.6 mm. Preferably, the transparency is higher than 8%, preferably higher than 10%, more preferably higher than 15%, for example higher than 20%, for example higher than 25%, for example higher than 35%, for example higher than 40%.

The heterophasic propylene copolymer and/or a composition consisting of the heterophasic propylene copolymer and additives may have a tensile modulus as measured according to ISO 527/1A with samples in the parallel orientation of injection moulding. Preferably, the tensile modulus is at least 600 MPa, more preferably at least 700, more preferably at least 800, more preferably at least 900 MPa.

The heterophasic propylene copolymer and/or a composition consisting of the heterophasic propylene copolymer and additives may have a gloss as determined according to ISO 2813 and DIN67530 at a measurement angle of 20°. Preferably, the gloss is at least 50, at least 55 or at least 60. The measurement scale of gloss, Gloss Units (GU), of a glossmeter is a scaling based on a highly polished reference black glass standard with a defined refractive index having a specular reflectance of 100GU at the specified angle. This standard is used to establish an upper point calibration of 100 with the lower end point established at 0 on a perfectly matte surface. The samples used for this test may be obtained by injection molding ISO 37/2 on the machine Arburg 60T, mould: 1-1-1-108, with geometry 65*65*3.2 mm. Gloss is the amount of light reflected in a certain direction by a surface of a sample made from the composition.

The heterophasic propylene copolymer and/or a composition consisting of the heterophasic propylene copolymer and additives may have an Izod notched impact (0° C., parallel), measured in accordance with ISO 180/4A of at least 0.5 KJ/m², preferably at least 1.0 KJ/m², more preferably at least 2.0 KJ/m², more preferably at least 3.0 kJ/m², more preferably at least 5.0 kJ/m². The heterophasic propylene copolymer may have an Izod notched impact (23° C., parallel), measured in accordance with ISO 180/4A of at least 0.5 KJ/m², preferably at least 1.0 KJ/m², more preferably at least 2.0 KJ/m², more preferably at least 3.5 kJ/m², more preferably at least 5.0 kJ/m², more preferably at least 9.0 kJ/m².

Preferably, the propylene-based matrix consists of a propylene homopolymer, the α-olefin copolymer in the dispersed ethylene-α-olefin copolymer is propylene, the amount of ethylene in the ethylene-α-olefin copolymer is in the range of 10-45 wt %, preferably 15-40 wt %, more preferably 15-30 wt %, more preferably 15-25 wt %.

Rubber content and $RCC_2$ (amount of ethylene in ethylene-alpha olefin copolymer) is measured with NMR and IR spectroscopy, which is calibrated using NMR according to known procedures.

Properties of Composition of (A) and (B) or of (A), (B) and (C)

Preferably, an article made from the composition according to the invention consisting of (A) and (B) or consisting of (A), (B) and (C) has the following properties.

In some embodiments, the MFIheterophasic is less than 15 dg/min and the article made from the composition according to the invention has
a transparency of at least 40% and/or,
a gloss at 20° of at least 50 and/or,
an Izod impact strength at 0° C. according to ISO 180 4A (test geometry: 65*12.7*3.2 mm, notch 45°, radius 0.25 mm, according to ISO 37/2 parallel orientation) of at least 3 kJ/m² and/or
an Izod impact strength at 23° C. according to ISO 180 4A (test geometry: 65*12.7*3.2 mm, notch 45°, radius 0.25 mm, according to ISO 37/2 parallel orientation) of at least 50 kJ/m².

In some embodiments, the MFIheterophasic is at least 15 dg/min and the article made from the composition according to the invention has
a transparency of at least 6% and/or,
a gloss at 20° of at least 45 and/or,
an Izod impact strength at 0° C. according to ISO 180 4A (test geometry: 65*12.7*3.2 mm, notch 45°, radius 0.25 mm, according to ISO 37/2 parallel orientation) of at least 3 kJ/m² and/or
an Izod impact strength at 23° C. according to ISO 180 4A (test geometry: 65*12.7*3.2 mm, notch 45°, radius 0.25 mm, according to ISO 37/2 parallel orientation) of at least 10 kJ/m².

Preferably, the properties of the composition can be represented in the following equation:

$$\left(1 + \frac{\text{Spot whiteness of composition}}{\text{Spot whiteness of heterophasic propylene copolymer}}\right)^{\frac{\text{haze of composition}}{\text{haze of heterophasic propylene copolymer}}} < 2.3 \quad \text{(equation 1)}$$

wherein the spot whiteness of the composition and of the heterophasic propylene copolymer are determined by
creating a white spot on a test piece with dimension 65*65*3.2 mm made by injection according to ISO 37/2 by dropping a ball of 500 grams from a height of 230 mm according to PV3905,
taking a photo of the white spot,
calculating a spot size of the white spot in the photo, wherein the spot size is defined as the size of the area which has 99.5% of the whiteness of the photo and calculating the spot whiteness by dividing a total whiteness of the white spot by the spot size, wherein the total whiteness of the white spot is 99.5% of the whiteness of the photo; and
wherein the haze of the composition and of the heterophasic propylene copolymer are determined according to ASTM D1003A.

A better (lower) spot whiteness and a better (lower) haze leads to a lower value of this equation. Spot whitenss and haze are indicative of optical properties of the sample. The output of the equation is more sensitive to haze than spot whiteness.

When $MFI_{heterophasic}$ is less than 15 dg/min, preferably, $$\left(1 + \frac{\text{Spot whiteness of composition}}{\text{Spot whiteness of heterophasic propylene copolymer}}\right)^{\frac{\text{haze of composition}}{\text{haze of heterophasic propylene copolymer}}}$$

is at most 2.2, more preferably at most 2.1, more preferably at most 2.0.

When $MFI_{heterophasic}$ is at least 15 dg/min, preferably, $$\left(1 + \frac{\text{Spot whiteness of composition}}{\text{Spot whiteness of heterophasic propylene copolymer}}\right)^{\frac{\text{haze of composition}}{\text{hasz of heterophasic propylene copolymer}}}$$

is at most 2.1, more preferably at most 2.0.

Further Aspects

The composition according to the invention may then be processed by any conventional technique known in the art into an article. Suitable examples of processing techniques wherein the composition according to the invention may be used include injection moulding, injection stretch blow moulding, compression moulding, extrusion and extrusion compression moulding, sheet extrusion, thermoforming or thin-walled injection moulding.

The invention further relates to an article comprising the composition according to the invention. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

Preferably, the article according to the invention is consumer appliances such as housings for household, electrical appliance and garden power tools, or thin wall packaging, caps and closure or containers and pails.

The invention further relates to the use of the article comprising the composition according to the invention for consumer appliances such as housings for household, electrical appliance and garden power tools, or thin wall packaging, caps and closure or containers and pails.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Heterophasic Propylene Copolymer

Two grades of pellets from SABIC comprising heterophasic propylene copolymer were used: CPC1 and CPC2. Both of CPC1 and CPC2 have a density of 0.905 g/cm3. The heterophasic propylene copolymers CPC1 and CPC2 comprise a matrix phase of a propylene homopolymer and 25 wt % of a dispersed phase of ethylene-propylene copolymer (RC=25 wt %). The ethylene content in the dispersed phase (RCC2) is 20%. The ethylene content in the heterophasic propylene copolymer is 5 wt %. The MFI of CPC1 is 4 dg/min at 230° C./2.16 kg. The MFI of CPC2 is 33 dg/min at 230° C./2.16 kg.

CPC1 contains 5100 ppm of additives (anti-static agents, clarifiers, antioxidants and acid scavengers).

CPC2 was obtained by shifting CPC1 with 1000 ppm peroxide.

Block Copolymer Comprising Styrene Block

Block copolymers commercially available from Kraton were used, as summarized in Table 1.

TABLE 1

| type | Kraton G1641 H SEBS | Kraton G1645 M SEBS | Kraton G1657 M SEBS | Kraton D1113 B SIS |
|---|---|---|---|---|
| MFI (dg/min) at 230° C., 2.16 Kg | 0 | 2.2 | 8.1 | 12.7 |
| MFI ratio relative to CPC1 | infinite | 1.8 | 0.5 | 0.3 |
| MFI ratio relative to CPC2 | infinite | 15 | 4.1 | 2.6 |
| Ethylene content (wt %) | | 22 | 50 | 0 |
| Styrene content (wt %) | 32.3-33.7 | 11.5-13.5 | 12.3-14.3 | 15.1-17.3 |

Along with the MFI of the block copolymers, the ratio of the MFIheterophasic/MFIblock is included in the table.

Preparation

Pellets were made by compounding a heterophasic propylene copolymer and a block copolymer as summarized in Tables 2-1 and 2-2 in a Kraus Maffei Berstorff twin screw extruder ZSK25 equipped with a shift screw at 184 RPM and a throughput of 13 kg/hour. Tables 2-1 and 2-2 summarize results where the heterophasic propylene copolymer was CPC1 and CPC2, respectively.

Various properties were measured as summarized in Tables 2-1 and 2-2.

TABLE 2-1

| | | Sample number | | | | | | |
|---|---|---|---|---|---|---|---|---|
| | | 1 (comp) | 2 | 3 | 4 | 5 | 6 (comp) | 7 |
| | | | | Heterophasic propylene copolymer CPC1 | | | | |
| | | | | Styrene block copolymer | | | | |
| | | | Kraton G1657 M | Kraton G1657 M | Kraton G1657 M | Kraton D1113 B | Kraton G1641 H | Kraton G1645 M |
| | | | | | wt % in composition | | | |
| Sample | | | 1 | 5 | 10 | 5 | 5 | 5 |
| Optical | Haze (%) | 44.3 | 43.9 | 46.6 | 51.6 | 46.7 | 51.9 | 42.3 |
| | Transmittance (%) | 79.6 | 80 | 77.8 | 74.3 | 78.3 | 80.4 | 81 |
| | Transparency (%) | 35.3 | 36.1 | 31.2 | 22.7 | 31.6 | 28.5 | 38.7 |
| | Gloss 20° | 76.4 | 78.1 | 78.8 | 77.8 | 76.5 | 71.2 | 76.2 |
| | White spot size (mm2) | 50 | 41 | 28 | 25 | 40 | 130 | 16 |
| | Spot whiteness | 40.06 | 37.00 | 27.79 | 21.36 | 32.13 | 50.33 | 24.31 |
| Mechanical | Izod (II) 0° C. (kJ/m$^2$) | 1.7 | 2.38 | 3.95 | 35.3 | 4.63 | 4.38 | 3.81 |
| | Izod (II) 23° C. (kJ/m$^2$) | 39.09 | 42.43 | 52.8 | 57.39 | 54.02 | 12.12 | 59.95 |
| | Tensile modulus (II) (N/mm$^2$) | 1100.4 | 1068.6 | 1010.6 | 952.3 | 1023.8 | 995.3 | 914.9 |
| MFI | MFI (230° C., 2.16 kg) | 4.84 | 4.73 | 5.08 | 5.95 | 4.43 | 3.77 | 4.39 |
| Outcome of equation 1 | | 2 | 1.88 | 1.7 | 1.63 | 1.84 | 2.5 | 1.58 |

The effects of addition of various types of styrene block copolymers to a heterophasic propylene copolymer can be understood.

Lower values of the spot size and whiteness together indicate less stress whitening. Lower value of the spot size indicates that the failure of the material is limited to a smaller area. Lower value of the whiteness indicates lower colour visibility of the failure of the material.

From comparison of samples 1 (comparative experiment), 3, 5, 6 (comparative experiment) and 7, it can be understood that the addition of a block copolymer having a relatively low ratio of MFIheterophasic and MFIblock (3, 5, 7) leads to a highly improved stress whitening property and impact strength while maintaining transparency and gloss and tensile modulus to acceptable levels. The addition of a block copolymer having a high ratio of MFIheterophasic and MFIblock (6) has a largely deteriorated stress whitening property and impact strength.

The addition of a block copolymer comprising a block comprising ethylene (3, 7) are more favorable in terms of stress whitening property than the addition of a block copolymer not comprising a block comprising ethylene (5). There is an optimum amount of ethylene in the block copolymer for the best whitening property, which is 10-40 wt % (7 vs 3).

As can be seen from the above table, for compositions according to the invention wherein the heterophasic propylene copolymer has an MFI of at most 15 dg/min, it is preferred that the outcome of equation 1 is less than 2.3, more preferably less than 2.0 as this gives the best balance between stress whitening and haze.

Comparison of samples 1, 2, 3 and 4 shows that a higher content of the block copolymer leads to a lower transparency, a better stress whitening property and a higher impact strength.

TABLE 2-2

| | | Sample number | | | | | | |
|---|---|---|---|---|---|---|---|---|
| | | 8 (comp) | 9 | 10 | 11 | 12 | 13 (comp) | 14 |
| | | | | Heterophasic propylene copolymer CPC2 | | | | |
| | | | | Styrene block copolymer | | | | |
| | | | Kraton G1657 M | Kraton G1657 M | Kraton G1657 M | Kraton D1113 B | Kraton G1641 H | Kraton G1645 M |
| | | | | | wt % in composition | | | |
| | Sample | | 1 | 5 | 10 | 5 | 5 | 5 |
| Optical | Haze (%) | 66.6 | 66.1 | 69.3 | 71.6 | 93 | 72.3 | 64.5 |
| | Transmittance (%) | 80.3 | 80.2 | 76.9 | 74.9 | 73.2 | 82.5 | 80.9 |
| | Transparency (%) | 13.7 | 14.1 | 7 | 3.3 | −19.8 | 10.2 | 16.4 |
| | Gloss 20° | 61 | 48.7 | 53.4 | 54.2 | 62.4 | 56.7 | 50.7 |
| | White spot size (mm2) | 224 | 221 | 178 | 162 | 202 | 212 | 204 |
| | Spot whiteness | 55.27 | 52.56 | 43.90 | 44.12 | 48.64 | 57.87 | 56.55 |

TABLE 2-2-continued

| | | 8 (comp) | 9 | 10 | 11 | 12 | 13 (comp) | 14 |
|---|---|---|---|---|---|---|---|---|
| | | | | Heterophasic propylene copolymer CPC2 | | | | |
| | | | | Styrene block copolymer | | | | |
| | | Kraton G1657 M | Kraton G1657 M | Kraton G1657 M | Kraton D1113 B | Kraton G1641 H | Kraton G1645 M | |
| | | | | wt % in composition | | | | |
| Sample | | | 1 | 5 | 10 | 5 | 5 | 5 |
| Mechanical | Izod (II) 0° C. (kJ/m$^2$) | 2.19 | 2.53 | 3.9 | 5.98 | 3.83 | 3.23 | 3.35 |
| | Izod (II) 23° C. (kJ/m$^2$) | 5.56 | 6.29 | 10.14 | 42.76 | 8.79 | 6.61 | 10.54 |
| | Tensile modulus (II) (N/mm$^2$) | 1042.9 | 1025 | 965.4 | 890.8 | 987.2 | 943.5 | 913.2 |
| MFI | MFI (230° C., 2.16 kg) | 31.45 | 30.99 | 29.06 | 27.84 | 28.75 | 25.87 | 30.32 |
| Outcome of equation 1 | | 2 | 1.96 | 1.8 | 1.88 | 2.6 | 2.14 | 2 |

From comparison of samples 8 (comparative experiment), 10, 12, 13 (comparative experiment) and 14, it can be understood that the addition of a block copolymer having a relatively low ratio of MFIheterophasic and MFIblock (10, 12 and 14) leads to a highly improved stress whitening property and impact strength while maintaining gloss and tensile modulus. The addition of a block copolymer having a high ratio of MFIheterophasic and MFIblock (13) does not lead to a large improvement of the stress whitening property.

The addition of a block copolymer comprising a block comprising ethylene (10, 14) are more favorable in terms of transparency than the addition of a block copolymer not comprising a block comprising ethylene (12). There is an optimum amount of ethylene in the block copolymer for the best whitening property, which is more than 40 wt % (10 vs 14).

Comparison of samples 8, 9, 10, 11 shows that a higher content of the block copolymer leads to a lower transparency, a better stress whitening property and a higher impact strength.

As can be seen from the above table, for compositions according to the invention wherein the heterophasic propylene copolymer has an WI of at least 15 dg/min, it is preferred that the outcome of equation 1 is less than 2.3, more preferably less than 2.2, more preferably less than 2.1, even more preferably less than 2.0 as this gives the best balance between stress whitening and haze.

The properties were measured as follows:

Transparency

Transparency is defined as Transmission minus Haze. The determination of the Haze and Transmission values was carried out in accordance with the standard ASTM D1003A. The test specimens are small plaque 65*65*1.6 mm with hinge, injected in machine Arburg 60T/DEMAG 60T, mould: 1-1-2-110.

Gloss

Gloss is the amount of light reflected in a certain direction by a surface of a sample made from the composition. The gloss was determined according to ISO 2813 and DIN67530 at a measurement angle of 20°. The samples used for this test are obtained by injection molding ISO 37/2 on the machine Arburg 60T, mould: 1-1-1-108, with geometry 65*65*3.2 mm Stress Whitening (Spot Size and Whitening)

Stress whitening is the appearance of a white area on an object when the object is stressed by a blushing operation. The appearance of the white area indicates that there is an onset of failure of the corresponding material.

The blushing on the samples was created according to PV3905, by dropping a ball of 500 grams from a height of 230 mm on a test piece with dimension 65*65*3.2 mm injected on the machine Arburg 60T, mould: 1-1-1-108, by ISO 37/2.

Photos of these test pieces were taken with a SLR digital camera (Canon 6D; 100 macro lens including an extender) with fixed settings and illumination conditions such that no under or over exposure is present.

Image analysis of the photos was done using a Matlab Graphical Interface (GUI) in order to determine the values of two parameters "spot size" and "spot whiteness". Parameter "spot size" indicates the dimensional visibility of the white area and "spot whiteness" indicates the colour visibility of the white area.

The spot size was determined as follows:

The total whiteness of the whole photo is calculated as the sum of the whiteness of each pixel in the whole photo. The whiteness of the intrinsic material is defined as 0. Each pixel constituting the sample has a whiteness of 0-255. The spot size is defined as the size of the area which has 99.5% of the whiteness of the whole photo.

The spot whiteness was determined as follows:

The total whiteness of the white spot in the photo is 99.5% of the whiteness of the whole photo. The spot whiteness is calculated by dividing the total whiteness of the white spot by the spot size.

Impact Strength

For purpose of the present invention, impact strength was measured by Izod test according to ISO 180 4A. Samples were obtained by cutting injected plaques (ISO 37/2 on the machine Arburg 60T, mould: 1-1-1-108) into 65*12.7*3.2 mm in the parallel orientation of moulding with 45° notch, radius 0.25 mm. The test temperatures were 0° C. and 23° C.

Stiffness (Tensile Modulus)

For purpose of the present invention, stiffness was determined by measuring the tensile modulus according to ISO 527/1A with samples in the parallel orientation of injection moulding. The test specimens were injected on machine Arburg 60T/DEMAG 60T, mould: 1-1-1-102/122, single side injection, Dimensions: 150*10*4 mm Melt Flow Index The flow of the composition obtained was determined by measuring the melt flow index according to ISO1133 at 230° C., 2.16 Kg.

The invention claimed is:

1. A composition comprising (A) a heterophasic propylene copolymer and (B) a block copolymer,
   wherein the heterophasic propylene copolymer consists of
   (a) a propylene-based matrix,
   wherein the propylene-based matrix consists of a propylene homopolymer and/or a propylene-α-olefin copolymer consisting of at least 90 wt % of propylene and at most 10 wt % of α-olefin, based on the total weight of the propylene-based matrix, and
   wherein the propylene-based matrix is present in an amount of 60 to 95 wt % based on the total heterophasic propylene copolymer, and
   (b) a dispersed ethylene-α-olefin copolymer,
   wherein the dispersed ethylene-α-olefin copolymer is present in an amount of 40 to 5 wt % based on the total heterophasic propylene copolymer, and
   wherein the sum of the total amount of propylene-based matrix and total amount of the dispersed ethylene-α-olefin copolymer in the heterophasic propylene copolymer is 100 wt %, and
   wherein the block copolymer comprises a terminal block comprising styrene or alpha-methylstyrene, and
   wherein the ratio of the melt flow rate of (A) the heterophasic propylene copolymer (MFIheterophasic) and the melt flow rate of (B) the block copolymer (MFIblock) is at most 50, wherein MFIheterophasic and MFIblock are measured in accordance with ISO 1133 using a 2.16 kg weight and at a temperature of 230 ° C.,
   wherein the amount of alpha-methylstyrene and/or styrene in the block copolymer is less than 20 wt %, based on the block copolymer,
   wherein the block copolymer has a non-terminal block comprising ethylene and the ethylene is present in the block copolymer in an amount of 10-40 wt %,
   wherein the amount of the block copolymer in the composition is between 0.5-10 wt % based on the total weight of the composition,
   wherein the amount of inorganic filler in the composition is at most 0.5 wt %.

2. Composition according to claim 1, wherein the amount of alpha-methylstyrene and/or styrene in the block copolymer is less than 15 wt % based on the block copolymer.

3. Composition according to claim 1, wherein the amount of the block copolymer in the composition is between 1-5 wt % based on the total weight of the composition.

4. The composition according to claim 1, wherein the properties of the composition fulfil the following equation:

$$\left(1 + \frac{\text{Spot whiteness of composition}}{\text{Spot whiteness of heterophasic propylene copolymer}}\right) \frac{\text{haze of composition}}{\text{haze of heterophasic propylene copolymer}} < 2.3 \quad \text{(equation 1)}$$

wherein the spot whiteness of the composition and of the heterophasic propylene copolymer are determined by creating a white spot on a test piece with dimension 65*65*3.2 mm made by injection according to ISO 37/2 by dropping a ball of 500 grams from a height of 230 mm according to PV3905,
taking a photo of the white spot,
calculating a spot size of the white spot in the photo, wherein the spot size is defined as the size of the area which has 99.5% of the whiteness of the photo and
calculating the spot whiteness by dividing a total whiteness of the white spot by the spot size, wherein the total whiteness of the white spot is 99.5% of the whiteness of the photo; and
wherein the haze of the composition and of the heterophasic propylene copolymer are determined according to ASTM D1003A.

5. The composition according to claim 1, wherein the melt flow rate of (B) the block copolymer is at least 0.5.

6. The composition according to claim 1, wherein the block copolymer is polystyrene-poly(ethylene-butylene)-polystyrene.

7. The composition according to claim 1, wherein the propylene-based matrix consists of a propylene homopolymer.

8. The composition according to according to claim 1, wherein the amount of ethylene in the ethylene-α-olefin copolymer of the heterophasic propylene copolymer is 10-45 wt %.

9. The composition according to claim 1, wherein the MFIheterophasic is less than 15 dg/min, wherein the MFIheterophasic is measured in accordance with ISO 1133 using a 2.16 kg weight and at a temperature of 230° C.

10. The composition according to claim, wherein the MFIheterophasic is at least 15 dg/min, wherein the MFIheterophasic is measured in accordance with ISO 1133 using a 2.16 kg weight and at a temperature of 230° C.

11. A process for the preparation of the composition according to claim 1, comprising melt mixing (A) and (B).

12. An article comprising the composition of claim 1.

13. The article according to claim 12, wherein the article is a consumer appliance.

14. The article according to claim 13, wherein the article is a housing for a household, an electrical appliance, a garden power tool, a thin wall packaging, a cap, a closure, or a container.

15. The composition according to claim 1, wherein the melt flow rate of (B) the block copolymer (MFIblock) is at most 40 dg/min.

16. The composition according to claim 1, wherein the melt flow rate of (B) the block copolymer (MFIblock) is at most 25 dg/min.

* * * * *